(12) United States Patent
Bradfield (10) Patent No.: US 8,552,600 B2
(45) Date of Patent: Oct. 8, 2013

(54) POTTED END TURNS OF AN ELECTRIC MACHINE

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 105 days.

(21) Appl. No.: 12/883,102

(22) Filed: Sep. 15, 2010

(65) Prior Publication Data

US 2011/0304228 A1 Dec. 15, 2011

Related U.S. Application Data

(63) Continuation-in-part of application No. 12/815,266, filed on Jun. 14, 2010.

(51) Int. Cl.
*H02K 9/00* (2006.01)

(52) U.S. Cl.
USPC .................................. 310/43; 310/52; 310/54

(58) Field of Classification Search
USPC ...................... 310/43, 260, 52, 54, 57–59, 64
See application file for complete search history.

(56) References Cited

U.S. PATENT DOCUMENTS

| | | | | |
|---|---|---|---|---|
| 3,060,335 | A | * | 10/1962 | Greenwald ..................... 310/54 |
| 4,739,204 | A | * | 4/1988 | Kitamura et al. ........... 310/68 D |
| 4,870,307 | A | * | 9/1989 | Kitamura et al. ............... 310/54 |
| 5,081,382 | A | | 1/1992 | Collings et al. |
| 5,180,004 | A | | 1/1993 | Nguyen |
| 5,207,121 | A | | 5/1993 | Bien |
| 5,372,213 | A | | 12/1994 | Hasebe et al. |
| 5,836,270 | A | * | 11/1998 | Aoki et al. .................. 123/41.31 |
| 5,965,965 | A | | 10/1999 | Umeda et al. |
| 6,011,332 | A | | 1/2000 | Umeda et al. |
| 6,069,424 | A | | 5/2000 | Colello et al. |
| 6,097,130 | A | | 8/2000 | Umeda et al. |
| 6,147,430 | A | | 11/2000 | Kusase et al. |
| 6,147,432 | A | | 11/2000 | Kusase et al. |
| 6,173,758 | B1 | | 1/2001 | Ward et al. |
| 6,181,043 | B1 | | 1/2001 | Kusase et al. |

(Continued)

FOREIGN PATENT DOCUMENTS

| | | |
|---|---|---|
| JP | 05-103445 A | 4/1993 |
| JP | 2002-095217 A | 3/2002 |

(Continued)

OTHER PUBLICATIONS

International Search Report, Received Feb. 16, 2012.

(Continued)

*Primary Examiner* — Dang Le
(74) *Attorney, Agent, or Firm* — Greenberg Traurig LLP (57) ABSTRACT

Embodiments of the invention provide an electric machine module and a method for cooling an electric machine module. The electric machine module includes an electric machine including a stator with stator end turns, a liquid-cooled housing at least partially enclosing the electric machine, and a potting material in contact with and at least partially surrounding the stator end turns. The method includes potting at least some of the stator end turns with the potting material to provide a thermally-conductive path from the stator end turns to the housing and circulating a coolant through the housing to at least remove heat energy conducted from the stator end turns to the housing.

7 Claims, 7 Drawing Sheets

(56) References Cited

U.S. PATENT DOCUMENTS

| | | | |
|---|---|---|---|
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,515,392 B2 | 2/2003 | Ooiwa |
| 6,522,043 B2 | 2/2003 | Masegi |
| 6,559,572 B2 | 5/2003 | Nakamura |
| 6,579,202 B2 | 6/2003 | El-Antably et al. |
| 6,674,188 B2 * | 1/2004 | Yockey et al. | 310/52 |
| 6,770,999 B2 | 8/2004 | Sakurai |
| 6,864,604 B2 * | 3/2005 | Nakano et al. | 310/57 |
| 6,897,594 B2 | 5/2005 | Ichikawa et al. |
| 6,998,749 B2 | 2/2006 | Wada et al. |
| 7,002,267 B2 | 2/2006 | Raszkowski et al. |
| 7,009,316 B2 * | 3/2006 | Ueda et al. | 310/43 |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,417,344 B2 | 8/2008 | Bradfield |
| 7,429,810 B2 * | 9/2008 | Ueda et al. | 310/54 |
| 7,508,100 B2 | 3/2009 | Foster |
| 7,530,156 B2 * | 5/2009 | Rippel et al. | 29/596 |
| 7,538,457 B2 | 5/2009 | Holmes et al. |
| 7,545,060 B2 | 6/2009 | Ward |
| 7,615,903 B2 | 11/2009 | Holmes et al. |
| 7,615,951 B2 | 11/2009 | Son et al. |
| 7,667,359 B2 | 2/2010 | Lee et al. |
| 7,948,126 B2 * | 5/2011 | Fulton et al. | 310/64 |
| 2004/0036367 A1 | 2/2004 | Denton et al. |

FOREIGN PATENT DOCUMENTS

| | | |
|---|---|---|
| JP | 2004-215353 A | 7/2004 |
| JP | 2004-248402 A | 9/2004 |
| JP | 2004-312886 A | 11/2004 |
| JP | 2006-060914 A | 3/2006 |
| JP | 2008-206213 A | 9/2008 |
| KR | 10-2000-0013908 A | 3/2000 |
| KR | 10-2007-0027809 A | 3/2007 |

OTHER PUBLICATIONS

International Search Report, Received Feb. 7, 2012.
International Search Report completed May 24, 2012.

* cited by examiner

POTTED END TURNS OF AN ELECTRIC MACHINE

RELATED APPLICATIONS

This application is a continuation-in-part application of U.S. application Ser. No. 12/815,266 filed on Jun. 14, 2010, the entire contents of which is incorporated herein by reference.

BACKGROUND

Conventional methods for cooling an electric machine include spraying or dispersing a coolant directly onto the electric machine. The coolant is often circulated through a coolant jacket surrounding the electric machine and coolant apertures direct the circulating coolant into a machine cavity of a housing enclosing the electric machine. Some types of coolant desired in specific applications, however, are not suitable for direct contact with the electric machine. In such applications, the heat generated by the electric machine must either convect to the surrounding air and/or conduct through multiple components to reach the coolant jacket. This can create a significant increase in thermal resistance for the electric machine, causing the temperature of the electric machine to rise.

SUMMARY

Some embodiments of the invention provide an electric machine module comprising an electric machine including a stator with stator end turns. The electric machine module can also include a liquid-cooled housing at least partially enclosing the electric machine and a potting material in contact with and at least partially surrounding at least some of the stator end turns. The potting material extends from the stator end turns toward an inner wall of the liquid-cooled housing adjacent to the stator end turns to provide a thermally-conductive path from the stator end turns to the liquid-cooled housing.

Some embodiments of the invention provide a method for cooling an electric machine. The method may include providing the electric machine including a stator with stator end turns and providing a liquid-cooled housing with an inner wall defining a machine cavity for at least partially housing the electrical machine. The liquid-cooled housing can define thermal cavities between the stator end turns and portions of the inner wall adjacent to the stator end turns. The method can also include potting at least one side of at least some of the stator end turns with a potting material to at least partially fill the thermal cavities with the potting material and to provide a thermally-conductive path from the stator end turns to the housing, and circulating a coolant through the liquid-cooled housing to at least remove heat energy conducted from the stator end turns to the housing.

Some embodiments of the invention provide a method for potting stator end turns of an electric machine. The method may include providing a mold with cavities comprising a geometry similar to thermal cavities of an electric machine housing, positioning the stator end turns within the mold, creating a vacuum within the cavities, gravity-feeding a potting material into the mold around at least some of the stator end turns to displace air within the cavities, and allowing the potting material to substantially harden around the stator end turns.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
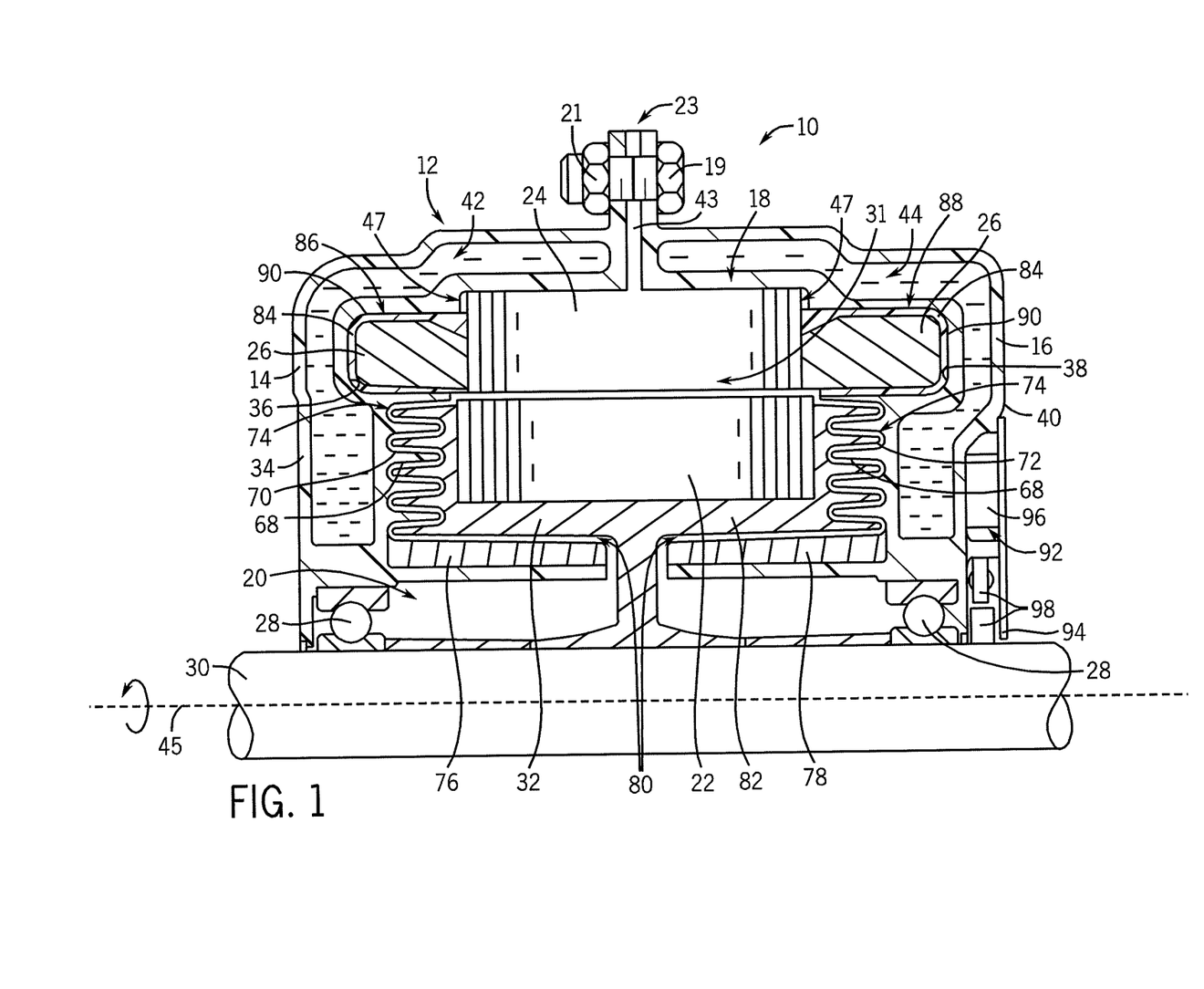
FIG. 1 is a partial front cross-sectional view of an electric machine module according to one embodiment of the invention.

FIG. 1 illustrates a portion of an electric machine module 10 according to one embodiment of the invention. The electric machine module 10 can include a housing 12 comprising two or more removably-coupled frame members, such as a twist end frame member 14 and a crown end frame member 16. An electric machine 18 can be housed within a machine cavity 20 at least partially defined by the removably-coupled frame members 14, 16. For example, the twist end frame member 14 and the crown end frame member 16 can be coupled via one or more bolts 19 and nuts 21 through a central lip 23 created by the removably-coupled frame members 14, 16, or another suitable coupling manner, to enclose the electric machine 18 within the machine cavity 20.

The electric machine 18 can include a rotor 22, a stator 24, stator end turns 26, and bearings 28, and can be disposed about a main output shaft 30. The stator 24 can circumscribe the rotor 22, and a radial air gap 31 can exist between the rotor 22 and the stator 24. In some embodiments, the electric machine 18 can also include a rotor hub 32 or can have a "hub-less" design (not shown). The electric machine 18 can be, without limitation, an electric motor, such as a hybrid electric motor, an electric generator, or a vehicle alternator. In one embodiment, as shown in FIG. 1, the electric machine 18 can be an induction belt-alternator-starter (BAS). In another embodiment, the electric machine 18 can be a High Voltage Hairpin (HVH) electric motor for use in a hybrid vehicle (i.e., for vehicle propulsion). In yet another embodiment, the electric machine 18 can be an interior permanent magnet (IPM) electric machine for use in a hybrid vehicle.

Components of the electric machine 18 such as, but not limited to, the stator 24 and the rotor 22 can generate heat during operation of the electric machine 18. These components can be cooled to enhance the performance of and increase the lifespan of the electric machine 18.

Figure 2A:
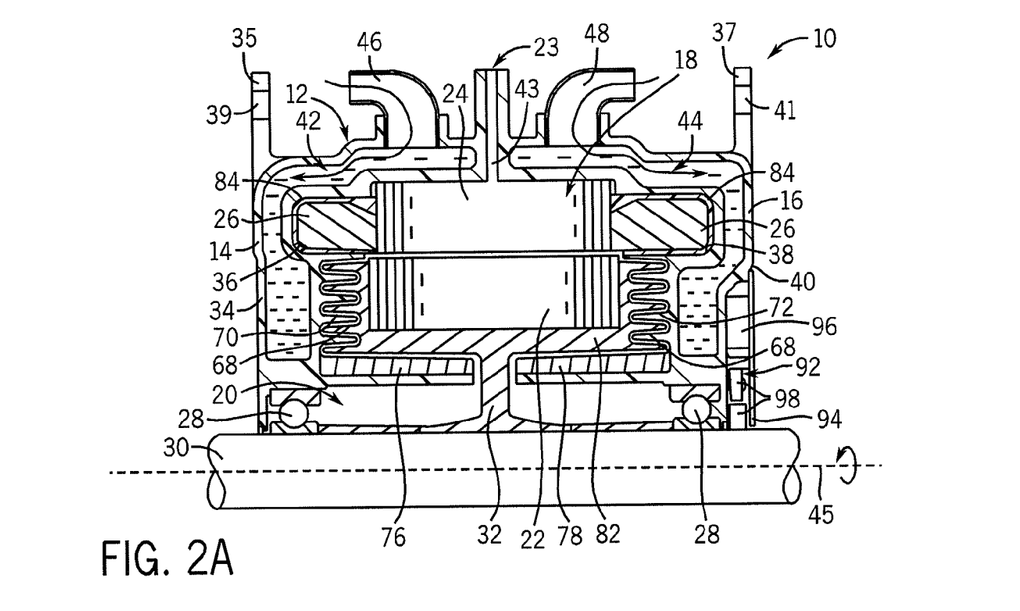
FIG. 2A is a partial front cross-sectional views of the electric machine module according to one embodiment of the invention.
Figure 2B:
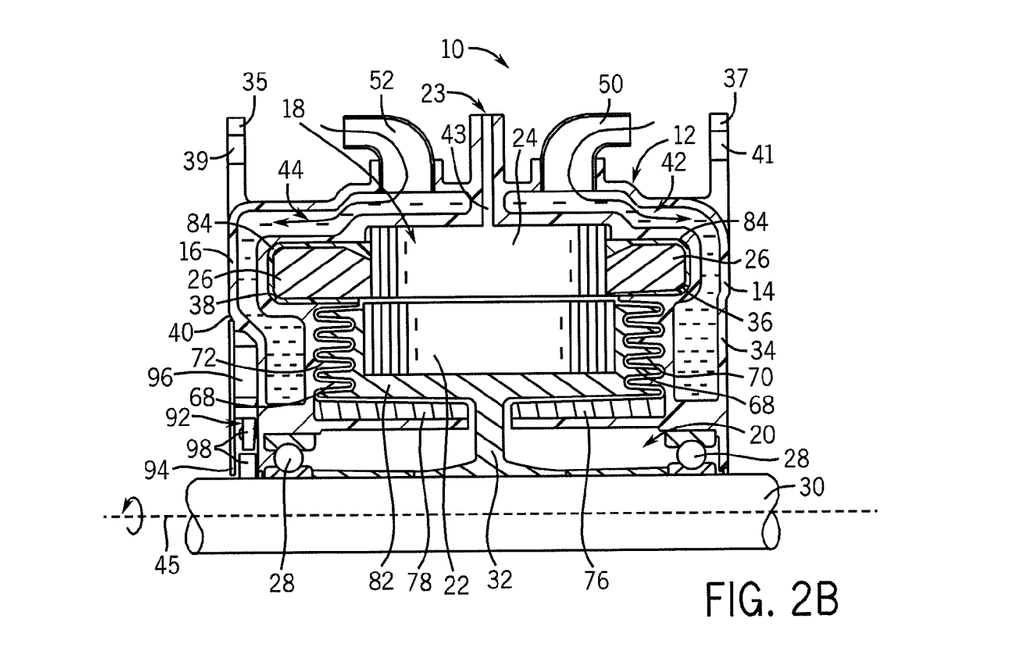
FIG. 2B is a partial back cross-sectional view of the electric machine module according to one embodiment of the invention.

In some embodiments, as shown in FIG. 1, the twist end frame member 14 and the crown end frame member 16 can be similarly manufactured or substantially identical, generally providing two halves of the housing 12 split along the center lip 23. The frame members 14, 16 can be fabricated from materials such as aluminum, steel, stainless steel, etc. through processes such as lost foam casting, investment casting, or other conventional fabrication processes. For example, in one embodiment the frame members 14, 16 can be fabricated from cast aluminum by lost foam casting. An outer wall 34 of the twist end frame member 14 can be configured to engage other machinery, such as a transmission body (not shown). An inner wall 36 of the twist end frame member 14 can be configured to receive the electric machine 18 within the machine cavity 20. In addition, the crown end frame member 16 can define an outer wall 38 and an inner wall 40 which can be configured to engage other machinery and to receive the electric machine 18 within the machine cavity 20, respectively. In some embodiments, the twist end frame member 14 and/or the crown end frame member 16 can include outer wall extensions 35, 37, respectively. The outer wall extensions 35, 37 can include holes 39, 41, as shown in FIGS. 2A-2B. Conventional fasteners (not shown) can be used through the holes 39, 41 to couple the housing 12 to a transmission body.

The stator 24 can comprise a substantially solid stack of stator laminations. In some embodiments, the stator laminations can be uniform in radial length so that the stator lamination stack has a smooth outer diameter. In other embodiments, one or more stator laminations 43 (e.g., the centrally-located stator laminations, as shown in FIG. 1) can extend radially past the rest of the stator lamination stack. In one embodiment, the extended stator laminations 43 can extend upward through an entire length of the central lip 23 between the twist end frame member 14 and the crown end frame member 16, as shown in FIG. 1. As a result, the one or more bolts 19 and nuts 21 passing through the central lip 23 can also pass through the extended stator laminations 43 in order to couple the stator 24 to the housing 12. In another embodiment, the extended stator laminations 43 can extend upward into the central lip 23, but not through the entire length of the central lip 23.

The extended stator laminations 43 can provide a datum plane for stacking the components of the electric machine module 10 in the axial direction during assembly. The datum plane created by the extended stator laminations 43 can help tightly control axial positioning of the electric machine 18. In addition, the datum plane can be more truly perpendicular to a center axis of rotation 45 of the electric machine 18. As a result, the components can be aligned to the center axis 45 more truly compared to electric machine modules aligned using outer edges of the stator 24.

By locating the electric machine 18 within the housing 12 using the extended stator laminations 43 through the central lip 23, clearance gaps 47 can be provided between one or both axial ends of the stator 24 and the housing 12. Further, by coupling the extended stator laminations 43 to the housing 12 through the central lip 23, torque produced by the electric machine 18 can be transferred to the housing 12. By securing the electric machine 18 to the housing 12 using the stator 24, the torque transmission can be less dependent upon the press-fit between the housing 12 and the outer diameter of the stator 24.

Figure 3:
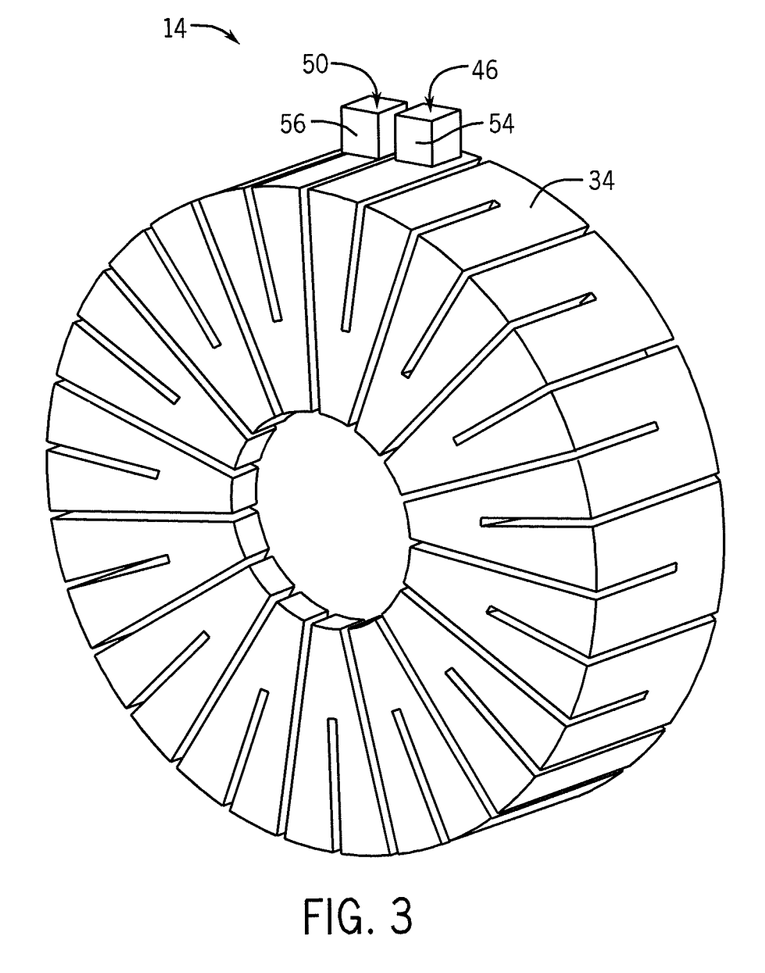
FIG. 3 is a perspective view of a frame member of the electric machine module of FIGS. 2A and 2B.

In some embodiments, the housing 12 can be a liquid-cooled housing. For example, coolant cavities 42, 44 can be positioned within the frame members 14, 16 (i.e., between the outer walls 34, 38 and the inner walls 36, 40). As shown in FIG. 1, each of the coolant cavities 42, 44 can be positioned both radially around the electric machine 18 (i.e., substantially circumscribing the stator 24) and axially adjacent to the electric machine 18 (i.e., along either side of the electric machine 18). The coolant cavities 42, 44 can be in fluid communication with a fluid source (not shown) via inlets 46, 48 and outlets 50, 52, which can be integral with the frame members 14, 16, respectively (as shown in FIGS. 2A, 2B, and 3). In some embodiments, as best shown in FIG. 3, the inlet 46 and the outlet 50 (and the inlet 48 and the outlet 52, not shown) can be housed in respective single bodies 54, 56. In one embodiment, the single bodies 54, 56 can be metal bodies press-fit to the outer walls 34, 38. An interface between the bodies 54, 56 and the outer walls 34, 38 can be sealed with a resin, such as epoxy.

In some embodiments, the twist end frame member 14 and the crown end frame member 16 can have substantially different axial lengths. As a result, the frame members 14, 16 can be coupled together at different axial lengths along the housing 12, for example, at a peripheral lip (not shown) created by the frame members 14, 16 as opposed to the central lip 23. In one embodiment, the twist end frame member 14 (or the crown end frame member 16) can extend across a majority of the axial length of the housing 12, substantially acting as a canister-type module at least partially surrounding the electric machine 18 and the crown end frame member 16 (or the twist end frame member 14) can act as a cap enclosing the canister-type module. In embodiments where the frame members 14, 16 have substantially different lengths, at least one of the coolant cavities 42 or 44 can be positioned both radially around the electric machine 18 and axially adjacent to the electric machine 18 and the other of the coolant cavities 42 or 44 can be positioned at least axially adjacent to the electric machine 18 (or both radially around the electric machine 18 and axially adjacent to the electric machine 18).

Figure 4A:
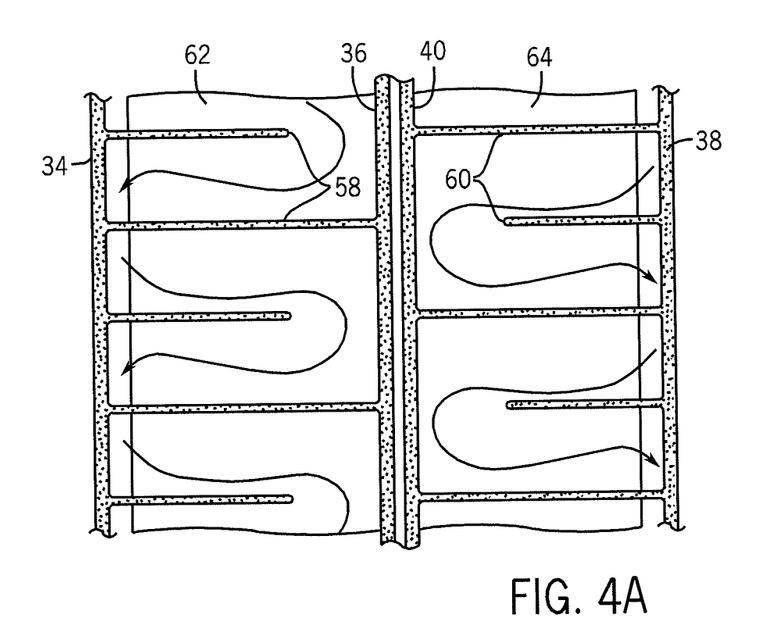
FIG. 4A is a partial side cross-sectional view of the electric machine module of FIG. 1.
Figure 4B:
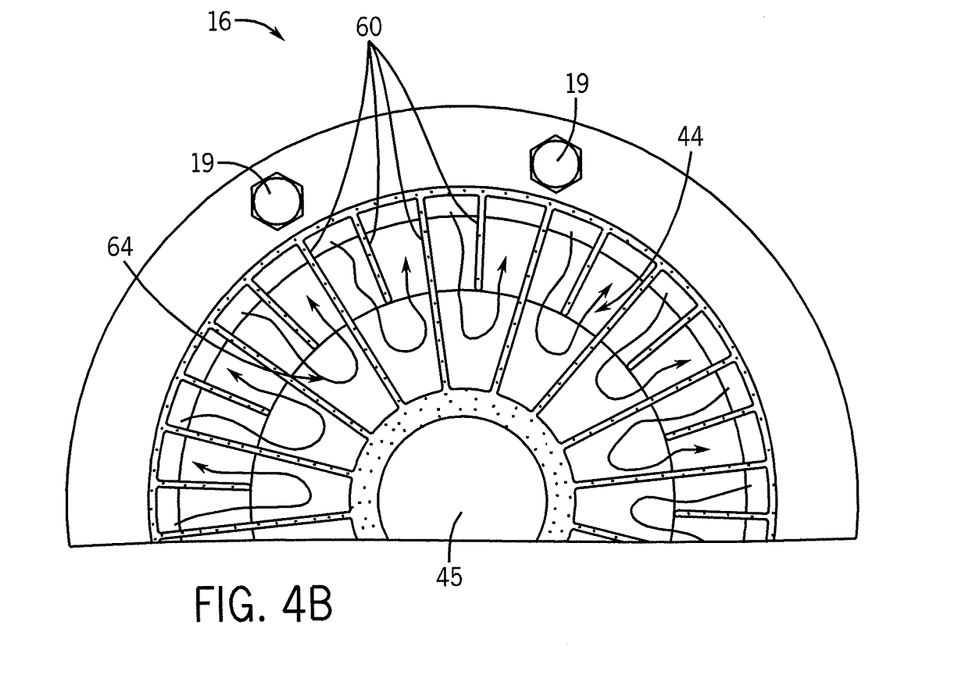
FIG. 4B is a partial side cross-sectional view of the electric machine module of FIG. 1.

As shown in FIGS. 3, 4A, and 4B, in some embodiments, an interior surface of the coolant cavities 42, 44 can include coolant cavity finning 58, 60. The coolant cavity finning 58, 60 can protrude into the coolant cavities 42, 44 in both radial and axial directions. The coolant cavity finning 58, 60 can be configured to form continuous channels 62, 64 in the coolant cavities 42, 44 which can receive a flowing coolant (indicated by arrows in FIGS. 4A and 4B). For example, the coolant can flow from the inlets 46, 48, through the continuous channels 62, 64, in a back and forth weaving pattern, to the outlets 50, 52. In other embodiments, the coolant cavity finning 58, 60 can protrude into the coolant cavities 42, 44 in the radial direction or in the axial direction. In yet other embodiments, the coolant cavities 42, 44 do not include the coolant cavity finning 58, 60 and coolant can flow straight from the inlets 46, 48 to the outlets 50, 52 without weaving back and forth.

By protruding into the coolant cavities 42, 44, the coolant cavity finning 58, 60 can provide more surface area to receive the coolant compared to a substantially planar surface, and thus, can allow more heat energy transfer from the electric machine 18 to the coolant and reduce thermal resistance. Further, by channeling the flow, rather than having a straight flow path, average flow velocity of the coolant can be increased, which can aid in heat transfer. In addition, the back and forth weaving pattern of the flow can force the coolant to turbulently scrub against surfaces of the coolant cavities 42, 44, further enhancing heat energy transfer from the electric machine 18 to the coolant. By splitting the flow path into two paths (i.e., a single, separate path in each of the frame members 14, 16), flow resistance can be reduced by about 25%, compared to electric machine modules with only a single flow path. The reduced flow resistance can allow more scrubbing of the coolant by the surfaces of the coolant cavities 42, 44 to further enhance cooling. Also, the coolant cavity finning 58, 60 can provide a conduction path from the inner walls 36, 40 to the outer walls 34, 38 so that heat from the electric machine 18 conducted to the inner walls 36, 40 can be conducted to the outer walls 34, 38. The outer walls 34, 38 can provide additional surface area to help remove the heat conducted from the electric machine 18.

In some embodiments, the coolant can be water, ethylene glycol, a mixture of water and ethylene glycol, motor oil, hydraulic fluid oil, antifreeze, or a similar fluid. The coolant can be pressurized when it enters the housing 12. After leaving the housing 12 via the outlets 50, 52, the coolant can flow toward a heat transfer element (not shown) outside of the housing 12 which can remove the heat energy received by the coolant. The heat transfer element can be a radiator or a similar heat exchanger device capable of removing heat energy.

As shown in FIG. 1, in some embodiments, the rotor hub 32 can include axial rotor hub finning 68. The axial rotor hub finning 68 can further increase heat energy dissipation from the electric machine 18 by providing additional surface area. The axial rotor hub finning 68 can be mounted to or integral with axial sides of the rotor hub 32 and can interface with the inner walls 36, 40 (e.g., in a substantially longitudinal manner). For example, the axial rotor hub finning 68 can be pressed onto the rotor 22. In one embodiment, the inner walls 36, 40 can include axial inner wall finning 70, 72 configured to interdigitate with or matingly engage the axial rotor hub finning 68. In one embodiment, an air cavity 74 can be defined between the axial inner wall finning 70, 72 and the axial rotor hub finning 68. In another embodiment, the axial inner wall finning 70, 72 and the axial rotor hub finning 68 can be in physical contact with each other and a lubricant can be used to reduce friction between them as the axial rotor hub finning 68 rotate.

Herein, the term matingly engage can refer to, but is not limited to, physical contact between engaging finning or no contact between engaging finning (e.g., separated by a lubricant or an air gap). Also, herein, the term interdigitate is not limited to alternating single digits of engaging finning, but can refer to alternating double digits of engaging finning, alternating single and double digits of engaging finning, etc.

During operation of the electric machine 18, the mating interaction between the axial rotor hub finning 68 and the axial inner wall finning 70, 72 can provide increased heat energy transfer between the rotating rotor 22 and rotor hub 32 and the stationary inner walls 36, 40 because of the relatively large surface area created by these features, compared to conventional electric machine modules. After transferring from the axial rotor hub finning 68 to the axial inner wall finning 70, 72, heat energy can be transferred to the coolant cavity finning 58, 60 (i.e., through the inner walls 36, 40). From the coolant cavity finning 58, 60, heat energy can be transferred to the circulating coolant. The coolant can then flow through the outlets 50, 52 toward the heat transfer element. In addition, some heat energy can be dissipated within the air cavity 74, due to a relatively high convection coefficient present in that area as a result of the relatively small air cavity 74 and the rotating rotor hub 32.

Figure 5A:
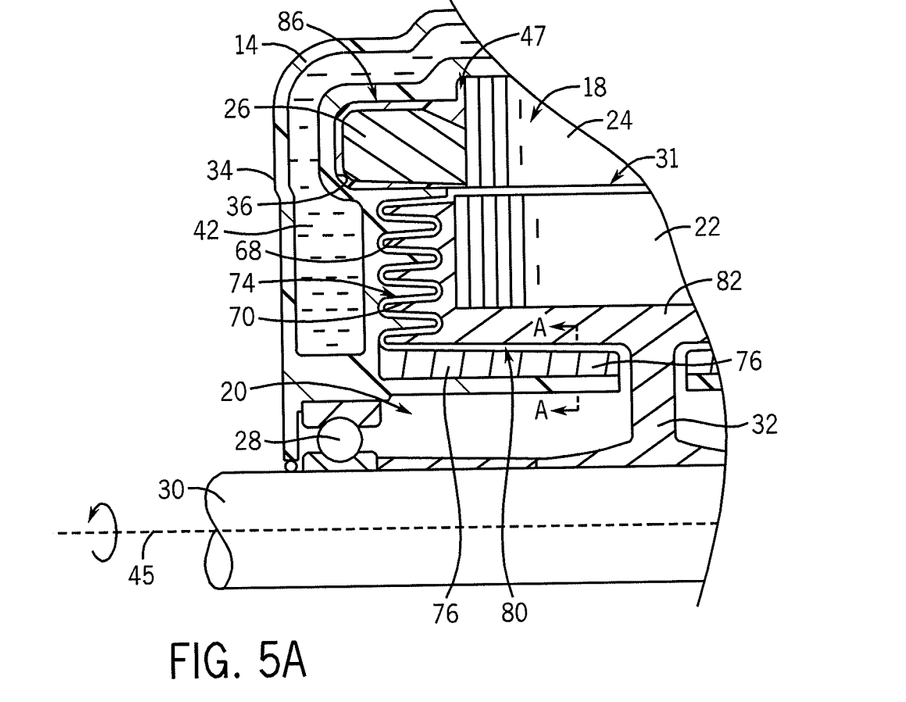
FIG. 5A is a partial front cross-sectional view of the electric machine module.
Figure 5B:
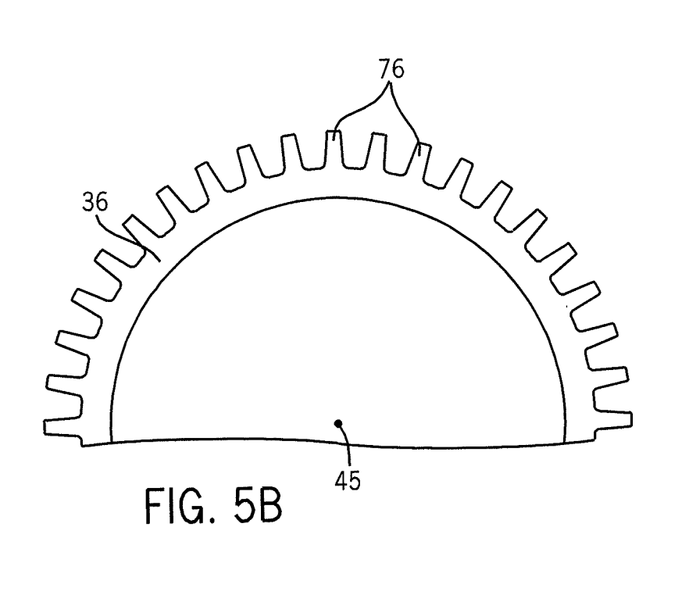
FIG. 5B is a cross-sectional view of a inner wall of the electric machine module along section A-A of FIG. 5A

In some embodiments, as shown in FIGS. 5A and 5B, radial inner wall finning 76, 78 can be mounted along, or integral with, the inner walls 36, 40 near an inner radial portion of the rotor hub 32 (i.e., near an inner diameter of the rotor hub 32). Compared to conventional electric machine modules, heat energy transfer can occur more efficiently between the rotor hub 32 and the radial inner wall finning 76, 78 because of the additional surface area provided by the radial inner wall finning 76, 78. The radial inner wall finning 76, 78 can provide additional surface area for heat transfer from the rotor hub 32 through an air gap 80 in the machine cavity 20 to the inner walls 36, 40. Some heat energy can be dissipated from the air gap 80 throughout the machine cavity 20 and other heat energy can be transferred through the inner walls 36, 40 to the coolant cavities 42, 44, where it can be transferred to the coolant and later removed by the heat transfer element. In addition, some heat energy can be dissipated within the air gap 80, due to a relatively high convection coefficient present in that area as a result of the relatively small air gap 80 and the rotating rotor hub 32.

Figure 6:
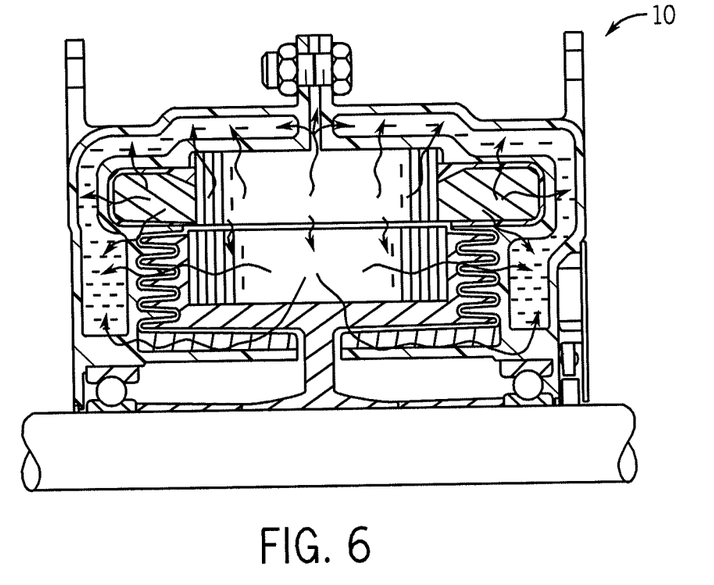
FIG. 6 is a cross-sectional view illustrating heat dissipation throughout the electric machine module of FIG. 1, according to one embodiment of the invention.

As described above, the frame members 14, 16 can provide a liquid-cooled housing 12 surrounding the electric machine 18 both radially and axially so that the coolant can be brought into close proximity of the heat-generating components of the electric machine 18. In addition, the radial inner wall finning 76, 78 can help surround the stator end turns 26 on three sides (i.e., axial outer, radial inner, and radial outer) with the liquid-cooled housing 12. By minimizing the distance from the heat-generating components to the coolant, thermal resistance can be reduced, and thus, cooling can be enhanced. For example, FIG. 6 illustrates flow paths of heat energy from the electric machine 18 to the coolant.

In some embodiments, the rotor hub 32 can include a base 82 that is thicker than conventional rotor hub bases. The thicker rotor hub base 82 can aid in axial and radial conduction of heat energy away from the rotor 22.

In some embodiments, as shown in FIG. 1, some or all of the stator end turns 26 can be potted in a potting material 84. The potting material 84 can be an epoxy resin, silicon, or a similar material that can gel or harden after being dispensed. The inner walls 36, 40 can be configured to define thermal cavities 86, 88 to receive the potted stator end turns 26. The potting method can create a conductive thermal path directly from the stator end turns 26 into the liquid-cooled housing 12, which can significantly increase heat dissipation from the stator 24 and the stator end turns 26. The desired potting material 84 for specific applications can be formulated based on characteristics such as dielectric constant, thermal conductivity, thermal expansion, chemical resistance, etc. The stator end turns 26 can be potted on one, two, or three sides in some embodiments to permit enhanced heat flow paths extending radially and/or axially from the stator end turns 26 to the housing 12. For example, the stator end turns 26 can be potted on any combination of their radial outer side (e.g., some or all of their outer diameter), their radial inner side (e.g., some or all of their inner diameter), and/or their axial outer side. In some embodiments, the method of potting the stator end turns 26 can be used as an alternative to spraying or dispersing a coolant onto the stator end turns 26 (e.g., for applications which require or specify a coolant not suitable for direct contact with the electric machine 18).

In one embodiment, the stator end turns 26 can be potted in an external mold (not shown) prior to being inserted into the machine cavity 20. For example, the potting material 84 can be heated and then gravity-fed into the mold, or gravity-fed into the mold and then heated, depending on the properties of the potting material 84. The mold can be shaped so that it forms a cavity around the stator end turns 26 similar in shape to the thermal cavities 86, 88. The potting material 84 can be dispensed into the mold and conform to the specific geometry of the mold. The stator end turns 26 can be positioned in the mold until the potting material 84 sets (e.g., substantially gels or hardens, either by cooling or heating), and then the potted stator end turns 26 can be inserted into the machine cavity 20. Also, a vacuum can be created when the potting material 84 is fed into the mold to use air pressure to aid in the flow of the potting material 84 and help remove any air pockets in the potted region. In another embodiment, the stator end turns 26 can be directly potted while inside the housing 12 with or without appropriate damming.

In one embodiment, a thermally-conductive material 90 can fill the any air gaps in the thermal cavities 86, 88 between the potted stator end turns 26 and the inner walls 36, 40. For example, the thermally-conductive material 90 can be placed onto mating surfaces of the inner walls 36, 40 and/or the potted stator end turns 26. The thermally-conductive material 90 can increase heat energy dissipation across the thermal cavities 86, 88 (i.e., compared to dissipating heat energy across any air gaps). The thermally-conductive material 90 can be a compound capable of conducting heat energy, such as thermal grease, a thermal paste, or a similar material. Heat energy can be transferred from the stator end turns 26, through the potting material 84, through the thermally-conductive material 90, to the inner walls 36, 40. Heat energy can then be transferred through the coolant cavity finning 58, 60 to the coolant and can be removed from the housing 12 via the coolant exiting the outlets 50, 52.

In one embodiment, the two frame members 14, 16 can be stepped, fabricated, or sculpted inward near the stator end turns 26 to reduce the size of the thermal cavities 86, 88. More specifically, the two frame members 14, 16 can be fabricated so that at least a portion of the inner walls 36, 40 protrude inward toward the stator end turns 26 in order to minimize the distance between the stator end turns 26 and the inner walls 36, 40 and reduce the thickness of the potting material 84 that heat energy from the stator end turns 26 must travel through to reach the inner walls 36, 40. By minimizing the distance that heat energy must travel to reach the inner walls 36, 40, thermal resistance can be reduced, and thus, cooling (i.e., removal of heat from the stator end turns 24) can be enhanced. In addition, by potting the stator end turns 26 in an external mold and then using the thermally-conductive material 90 to fill the void between the stator end turns 26 and the frame members 14, 16, as opposed to potting the stator end turns 26 inside the frame members 14, 16, the electric machine 18 is capable of being disassembled from the frame members 14, 16 for future services, repair, etc. Also, in some embodiments, because the stator end turns 26 are potted in an external mold, the housing 12 can comprise the two separate frame members 14, 16 each able to surround the electric machine 18 axially and radially, compared to some housings 12 which must be configured otherwise so that the inserted stator end turns 26 can be accessed by the potting material 84.

Figure 8:
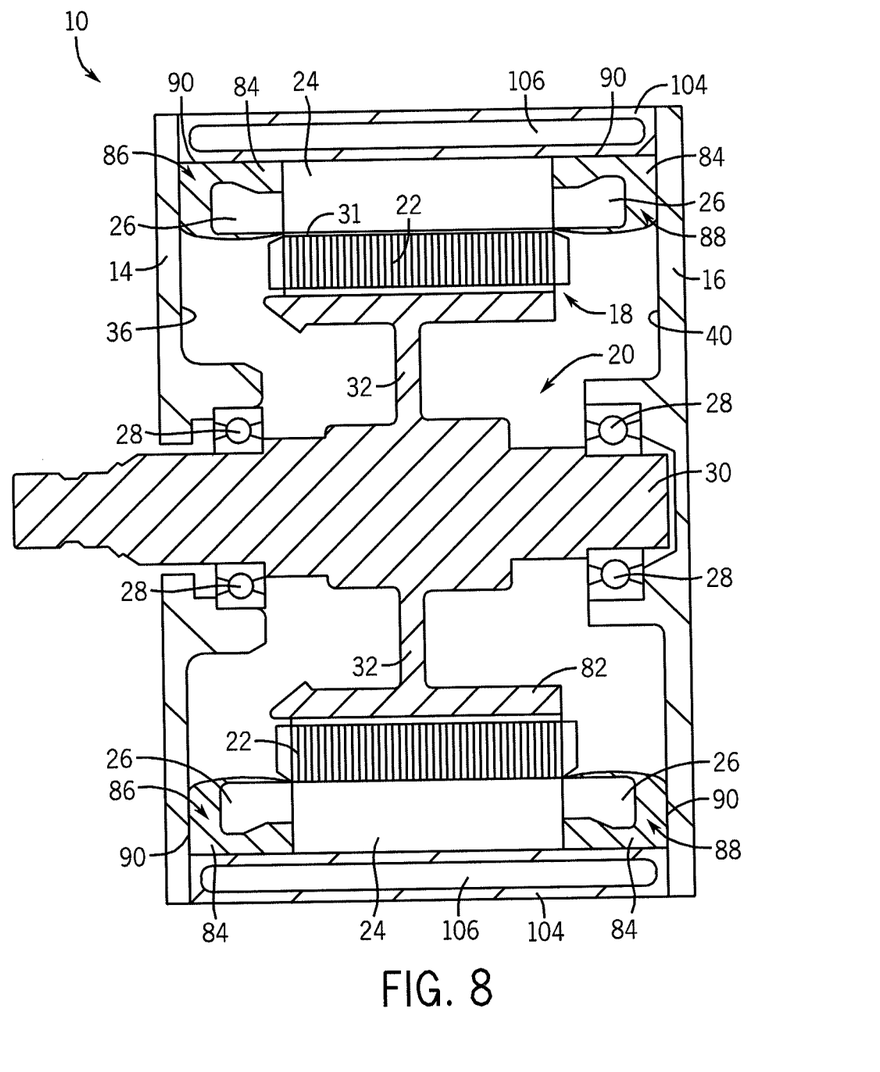
FIG. 8 is a front cross-sectional view of an electric machine module according to another embodiment of the invention.

In some embodiments, the method of potting the stator end turns 26 can be applied to electric machine modules 10 including housings 12 with various geometries and/or different components. For example, in one embodiment, as shown in FIG. 8, a housing 12 can include the two frame members 14, 16 substantially acting as end caps which can be coupled to a central sleeve member 104. The central sleeve member 104 can at least partially surround the electric machine 18 and can extend across a majority of the axial length of the housing 12. As a result, the two frame members 14, 16 as well as the central sleeve member 104 can be configured to define the thermal cavities 86, 88. In another example, a housing (not shown) can include a single frame member substantially acting as an end cap which can be coupled to a canister-type member.

As shown in FIG. 8, the stator end turns 26 can be potted as described above so that heat energy can be transferred from the stator end turns 26, through the potting material 84 and the thermally-conductive material 90 in both radial and axial directions, to the liquid-cooled housing 12. Heat energy can then be transferred to a coolant circulating through the housing 12 and can be removed from the housing 12 via the coolant exiting outlets (not shown). The stator end turns 26 can be potted on one or more sides in order for the potting material 84 to contact or extend near the central sleeve member 104 and/or the two frame members 14, 16. In one embodiment, as shown in FIG. 8, the central sleeve member 104 can include a coolant jacket 106 positioned substantially radially around the electric machine 18 so that a coolant can circulate through the liquid-cooled housing 12 substantially circumferentially around the electric machine 18. In another embodiment, the central sleeve member 104 can include the coolant jacket 106 radially around the electric machine 18 and the two frame members 14, 16 can include coolant cavities (not shown) positioned axially adjacent to the electric machine 18 so that the coolant can circulate through the liquid-cooled housing 12 both substantially circumferentially around the electric machine 18 as well as substantially axially adjacent to the electric machine 18. In yet another embodiment, only the two frame members 14, 16 can include the coolant cavities positioned axially adjacent to the electric machine 18 so that the coolant can circulate through the liquid-cooled housing 12 only substantially axially adjacent to the electric machine 18.

In some embodiments, the housing 12 including the two frame members 14, 16, as shown in FIGS. 1-7 can require fewer fasteners than some conventional machine housing designs. For example, the two frame members 14, 16 can be coupled together at a single joint (i.e., the central lip 23) compared to housings requiring two separate joints for assembly. In addition, the two frame members 14, 16 can be substantially stronger than conventional machine housing elements and can better maintain alignment of the electric machine 18 as described above, and thus, do not require any angular span between fasteners. In addition, the central lip 23 can provide more radial space for larger bolts or fasteners to be used. The larger bolts can provide greater clamp pressure compared to smaller fasteners used in conventional structures which are often limited to the thickness of the housing.

In some embodiments, the crown end frame member 16 can include a recess 92 located in a region of the outer wall 38. Electrical components can be located within this recess 92, such as a terminal block 96, a position sensor 98, etc., as shown in FIGS. 1, 2A-2B, and 6. As a result of storing the components in the recess 92, an added axial length of the housing 12, which is often undesirable in many applications, is not necessary. A cover plate 94 can be removably coupled to the outer wall 38 enclosing the recess 92 in order to secure the electrical components within the recess 92. In some embodiments, the position sensor 98 can be a angular position sensor for the electric machine 18 and can be located with within the recess 92 outside of the machine cavity 20 (as shown in FIG. 1) or inside the machine cavity 20 (not shown). The position sensor 98 being located outside the machine cavity 20 can allow more accessibility for service, maintenance, or other purposes.

Figure 7:
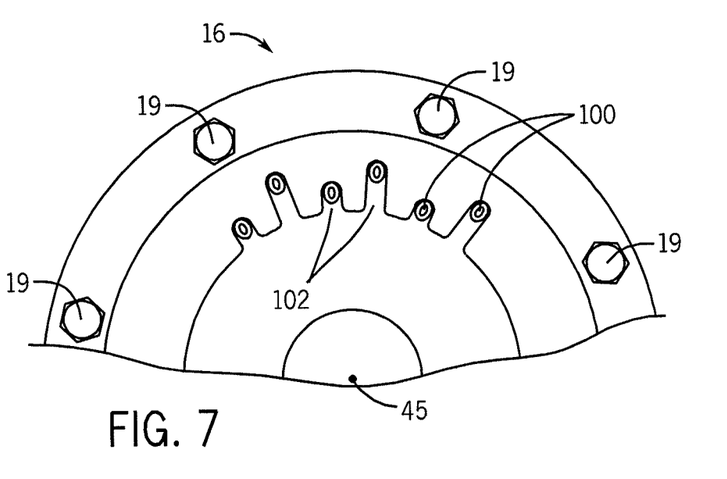
FIG. 7 is a perspective view of a frame member of the electric machine module of FIG. 1.

In addition, in some embodiments, the terminal block 96 can be a molded plastic terminal block which can connect stator phase leads 100 to outside wiring connections via copper terminals. The stator phase leads 100 can be copper conductor phase leads from the stator 24. The terminal block 96 can be configured to connect to the outside wiring connections in an axial or radial manner. As shown in FIG. 7, the crown end frame member 16 can further include channels 102 to accommodate the stator phase leads 100. In one embodiment, during casting of the crown end frame member 16, the outer wall 38 can be sunken in to a depth of the inner wall 40 to create the channels 102.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
   an electric machine including a rotor and a stator with stator end turns;
   a liquid-cooled housing at least partially enclosing and supporting the electric machine, the housing further including two inner walls each adjacent to a stator end turn, the two inner walls each separately forming a portion of two separate coolant cavities;
   each coolant cavity positioned substantially around a stator end turn radially and substantially beside a stator end turn axially and substantially beside at least a portion of the rotor radially; and
   wherein each coolant cavity defines a single and separate flow path in each of the two separate coolant cavities; and
   a potting material in contact with the stator end turns, wherein the potting material substantially surrounds at least three sides of substantially all the stator end turns including an outer diameter of the stator end turns, an inner diameter of the stator end turns, and an axial outer end of the stator end turns, the potting material extending from the stator end turns toward the inner walls of a coolant cavity to provide a thermally conductive path from the at least three sides of substantially all the stator end turns to a coolant cavity defined by the liquid-cooled housing.

2. The electric machine module of claim 1 wherein the thermally-conductive path provided by the potting material extends from the stator end turns to the inner wall of the liquid-cooled housing in a radial direction and in an axial direction.

3. The electric machine module of claim 1 and further comprising a thermally conductive material located on mating surfaces between the potting material and the inner wall, the thermally-conductive material comprising one of a thermal paste and a thermal grease.

4. The electric machine module of claim 1 wherein the potting material comprises one of an epoxy resin and silicon.

5. The electric machine module of claim 1 wherein the electric machine is a hybrid electric motor for use in vehicle propulsion.

6. The electric machine module of claim 1 wherein the electric machine is an interior permanent magnet electric machine.

7. The electric machine module of claim 1 wherein at least a portion of the inner wall protrudes inward toward the stator end turns to minimize a distance between the stator end turns and the inner walls.

* * * * *